United States Patent
Miki et al.

(10) Patent No.: US 12,087,262 B2
(45) Date of Patent: Sep. 10, 2024

(54) SOUNDPROOF MEMBER

(71) Applicant: NICHIAS CORPORATION, Tokyo (JP)

(72) Inventors: Tatsuro Miki, Tokyo (JP); Kazuhiro Kikuchi, Tokyo (JP); Tetsuya Sasakawa, Tokyo (JP); Ikuma Fujisawa, Tokyo (JP)

(73) Assignee: NICHIAS CORPORATION, Tokyo (JP)

( * ) Notice: Subject to any disclaimer, the term of this patent is extended or adjusted under 35 U.S.C. 154(b) by 194 days.

(21) Appl. No.: 17/762,166

(22) PCT Filed: Jul. 10, 2020

(86) PCT No.: PCT/JP2020/027062
§ 371 (c)(1),
(2) Date: Mar. 21, 2022

(87) PCT Pub. No.: WO2021/065145
PCT Pub. Date: Apr. 8, 2021

(65) Prior Publication Data
US 2022/0383845 A1    Dec. 1, 2022

(30) Foreign Application Priority Data
Oct. 3, 2019    (JP) ................ 2019-183180

(51) Int. Cl.
*G10K 11/168*    (2006.01)
*B32B 5/02*    (2006.01)
*B32B 27/12*    (2006.01)

(52) U.S. Cl.
CPC .......... *G10K 11/168* (2013.01); *B32B 5/02* (2013.01); *B32B 27/12* (2013.01);
(Continued)

(58) Field of Classification Search
CPC ......... G10K 11/168; B32B 5/02; B32B 27/12; B32B 2250/04; B32B 2274/00;
(Continued)

(56) References Cited

U.S. PATENT DOCUMENTS 5,304,415 A    4/1994  Kurihara et al.
8,796,164 B2 *  8/2014  Restuccia ............... B32B 5/022
                                                        442/247
(Continued)

FOREIGN PATENT DOCUMENTS

CN    103339669 A    10/2013
CN    109219845 A     1/2019
(Continued)

OTHER PUBLICATIONS

Sep. 11, 2023 Extended European Search Report issued in European Patent Application No. 20872103.5.
(Continued)

*Primary Examiner* — Forrest M Phillips
(74) *Attorney, Agent, or Firm* — Oliff PLC

(57) ABSTRACT

A soundproof member includes: a first elastic porous body layer; a first film layer; a second elastic porous body layer; and a second film layer, the layers arranged in the stated order from a sound source (S) side, wherein the first and second elastic porous body layer each have: a thickness of 0.5 mm or more and 10 mm or less; a bulk density of 45 kg/m$^3$ or more and 550 kg/m$^3$ or less; and a Young's modulus of 7,000 Pa or more and 28,000 Pa or less, and wherein a total (L1/Λ1+L2/Λ2) of a ratio (L1/Λ1) of the thickness L1 (mm) of the first elastic porous body layer to a viscous characteristic length Λ1 (μm) thereof and a ratio (L2/Λ2) of the thickness L2 (mm) of the second elastic porous body layer (20) to a viscous characteristic length Λ2 (μm) thereof is 0.11 or more.

4 Claims, 2 Drawing Sheets

(52) U.S. Cl.
CPC ....... *B32B 2250/04* (2013.01); *B32B 2274/00* (2013.01); *B32B 2307/102* (2013.01); *B32B 2307/51* (2013.01); *B32B 2307/54* (2013.01); *B32B 2307/72* (2013.01); *B32B 2307/732* (2013.01)

(58) Field of Classification Search
CPC .......... B32B 2307/102; B32B 2307/51; B32B 2307/54; B32B 2307/72; B32B 2307/732
See application file for complete search history.

(56) References Cited

U.S. PATENT DOCUMENTS

| | | | |
|---|---|---|---|
| 9,631,361 B2* | 4/2017 | Clausi | E04F 15/107 |
| 10,421,249 B2* | 9/2019 | Mori | B32B 27/12 |
| 2008/0196971 A1 | 8/2008 | Charbonnier et al. | |
| 2010/0272983 A1 | 10/2010 | Thouilleux et al. | |
| 2014/0018759 A1* | 1/2014 | Jayasinghe | A61F 13/51464 604/370 |
| 2014/0027200 A1 | 1/2014 | Mori et al. | |
| 2016/0318815 A1 | 11/2016 | Thouilleux et al. | |
| 2017/0129204 A1* | 5/2017 | Mori | B32B 37/10 |
| 2018/0142387 A1* | 5/2018 | Wang | B32B 5/022 |
| 2018/0144734 A1* | 5/2018 | Wang | B32B 27/12 |
| 2019/0329524 A1* | 10/2019 | Murayama | C04B 38/10 |

FOREIGN PATENT DOCUMENTS

| | | |
|---|---|---|
| EP | 2 860 294 A1 | 4/2015 |
| EP | 3 467 817 A1 | 4/2019 |
| JP | 2007-199270 A | 8/2007 |
| JP | 2008-191506 A | 8/2008 |
| JP | 2011-506250 A | 3/2011 |
| JP | 2017-167251 A | 9/2017 |
| WO | 2012/102345 A1 | 8/2012 |
| WO | 2017/208930 A1 | 12/2017 |

OTHER PUBLICATIONS

Sep. 29, 2020 International Search Report issued in International Patent Application No. PCT/JP2020/027062.

Miki, Tatsuro, "Technical Report: Estimation of Biot Parameters of Fibrous Porous Sound-Absorbing Material," Nichias Technology Times, No. 380, Jan. 2018, pp. 18-23.

"Analysis of Sensitivity of Biot Parameters to Acoustic Characteristics," Nichias Technical Report, vol. 4, No. 375, 2016.

"Development of a Lightweight Soundproof Cover Using the Biot Theory (Theory of Vibration Propagation in Elastic Porous Materials), and an Example Application thereof to a Transmission," Nichias Technical Report, vol. 4, No. 375, 2016.

Mar. 12, 2024 Office Action issued in Chinese Application No. 202080069620.4.

* cited by examiner

SOUNDPROOF MEMBER

TECHNICAL FIELD

The present invention relates to a soundproof member.

BACKGROUND ART

In Patent Literature 1, there is a description of a soundproof material including: a first sound-absorbing material arranged to face a sound source; a first soft sound-insulating layer, which is laminated on a surface of the first sound-absorbing material opposite to the sound source, and has an air permeability measured in accordance with JIS L1018 of 10 cc/cm²·sec or less; a second sound-absorbing material laminated on the first soft sound-insulating layer; and a second soft sound-insulating layer, which is laminated on the second sound-absorbing material, and has an air permeability measured in accordance with JIS L1018 of 10 cc/cm²·sec or less and a Young's modulus measured in accordance with JIS K7127 five or more times as high as that of the first soft sound-insulating layer, wherein at least the second soft sound-insulating layer is partially or entirely bonded to the second sound-absorbing material.

In Non-Patent Literature 1, there is a description of analysis of sensitivity of Biot parameters to acoustic characteristics. In Non-Patent Literature 2, there are descriptions of development of a lightweight soundproof cover using the Biot theory (theory of vibration propagation in elastic porous materials), and an example application thereof to a transmission.

CITATION LIST

Patent Literature

[PTL 1] WO 2012/102345 A1

Non-Patent Literature

[NPL 1] Analysis of Sensitivity of Biot Parameters to Acoustic Characteristics, Nichias Technical Report, 2016, Volume 4, No. 375

[NPL 2] Development of a Lightweight Soundproof Cover Using the Biot Theory (Theory of Vibration Propagation in Elastic Porous Materials), and an Example Application thereof to a Transmission, Nichias Technical Report, 2016, Volume 4, No. 375

SUMMARY OF INVENTION

Technical Problem

However, although, as described in Non-Patent Literatures 1 and 2, analysis based on the Biot theory has been recognized as useful for evaluating the soundproof characteristics of a soundproof member, trial and error has still been required as to specifically what configuration a novel soundproof member having desired soundproof characteristics should have.

The present invention has been made in view of the above-mentioned problem, and one of the objects of the present invention is to provide a soundproof member having excellent soundproof characteristics.

Solution to Problem

In order to solve the above-mentioned problem, according to one embodiment of the present invention, there is provided a soundproof member, including: a first elastic porous body layer; a first film layer; a second elastic porous body layer; and a second film layer, the layers being arranged in the stated order from a sound source side, wherein the first elastic porous body layer and the second elastic porous body layer each have: a thickness of 0.5 mm or more and 10 mm or less; a bulk density of 25 kg/m³ or more and 2,000 kg/m³ or less; and a Young's modulus of 7,000 Pa or more and 28,000 Pa or less, and wherein a total (L1/Λ1+L2/Λ2) of a ratio (L1/Λ1) of the thickness L1 (mm) of the first elastic porous body layer to a viscous characteristic length Λ1 (μm) thereof and a ratio (L2/Λ2) of the thickness L2 (mm) of the second elastic porous body layer to a viscous characteristic length Λ2 (μm) thereof is 0.11 or more. According to the present invention, a soundproof member having excellent soundproof characteristics is provided.

In the soundproof member, the first elastic porous body layer and the second elastic porous body layer may each be a fibrous body layer. In the soundproof member, the first film layer and the second film layer may each be an elastomer film layer.

Advantageous Effects of Invention

According to the present invention, a soundproof member having excellent soundproof characteristics is provided.

DESCRIPTION OF EMBODIMENTS

Now, one embodiment of the present invention will be described. The present invention is not limited to this embodiment.

Figure 1:
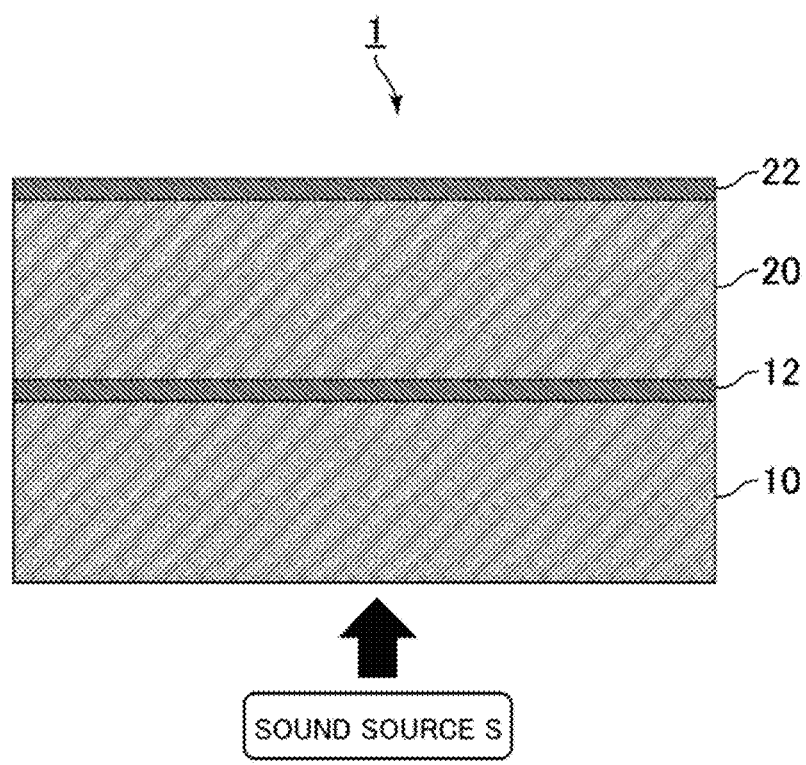
FIG. 1 is an explanatory view for schematically illustrating a main configuration in a soundproof member according to one embodiment of the present invention.

A main configuration in a soundproof member 1 according to this embodiment is schematically illustrated in FIG. 1. The soundproof member 1 includes: a first elastic porous body layer 10; a first film layer 12; a second elastic porous body layer 20; and a second film layer 22, the layers being arranged in the stated order from a sound source S side, wherein the first elastic porous body layer 10 and the second elastic porous body layer 20 each have: a thickness of 0.5 mm or more and 10 mm or less; a bulk density of 25 kg/m³ or more and 2,000 kg/m³ or less; and a Young's modulus of 7,000 Pa or more and 28,000 Pa or less, and wherein a total (hereinafter referred to as "specific parameter (L1/Λ1+L2/Λ2)") of a ratio (L1/Λ1) of the thickness L1 (mm) of the first elastic porous body layer 10 to a viscous characteristic length Λ1 (μm) thereof and a ratio (L2/Λ2) of the thickness L2 (mm) of the second elastic porous body layer 20 to a viscous characteristic length Λ2 (μm) thereof is 0.11 or more.

That is, the inventors of the present invention have made extensive investigations in the development of a soundproof member having excellent soundproof characteristics, and as a result, have independently found that, surprisingly, a soundproof member falling within a predetermined range of the above-mentioned specific parameter (L1/Λ1+L2/Λ2) is excellent not only in transmission loss, but also in insertion loss. Thus, the present invention has been completed.

As illustrated in FIG. 1, in the soundproof member 1, the first elastic porous body layer 10 is arranged at the closest position to the sound source S among the above-mentioned four layers 10, 12, 20, and 22, the first film layer 12 is arranged on the opposite side of the first elastic porous body layer 10 to the sound source S, the second elastic porous body layer 20 is arranged on the opposite side of the first film layer 12 to the sound source S, and the second film layer 22 is arranged on the opposite side of the second elastic porous body layer 20 to the sound source S.

The sound source S is not particularly limited as long as the sound source S emits a sound serving as the target of soundproofing. The frequency of the noise to be emitted by the sound source S is not particularly limited, but may fall within, for example, the range of from 10 Hz or more to 10 kHz or less, or the range of from 100 Hz or more to 2,500 Hz or less.

The first elastic porous body layer 10 and the second elastic porous body layer 20 are each formed of an elastic porous body. The elastic porous body is not particularly limited as long as the elastic porous body is a porous material having elasticity and showing a sound-absorbing property, but may be, for example, a fibrous body or a foam-molded body. That is, the first elastic porous body layer 10 and the second elastic porous body layer 20 may each be independently formed of a fibrous body or a foam-molded body.

When the first elastic porous body layer 10 and the second elastic porous body layer 20 are each a fibrous body layer formed of a fibrous body, the first elastic porous body layer 10 and the second elastic porous body layer 20 may each be formed of a fibrous body of an organic fiber, or may each be formed of a fibrous body of an inorganic fiber, but are each preferably an organic fibrous body layer formed of a fibrous body of an organic fiber.

The organic fiber is, for example, one or more selected from the group consisting of: a resin fiber; cotton; wool; *excelsior*; a kudzu fiber; and a kenaf fiber. The organic fiber is preferably a resin fiber, particularly preferably a thermoplastic resin fiber.

The resin fiber is, for example, one or more selected from the group consisting of: polyester fibers, such as a polyethylene terephthalate (PET) fiber; polyamide fibers, such as a nylon fiber; polyolefin fibers, such as a polyethylene fiber and a polypropylene fiber; and acrylic fibers.

The inorganic fiber is, for example, one or more selected from the group consisting of: glass wool; rock wool; a silica fiber; an alumina fiber; a silica-alumina fiber; an aramid fiber; a rock wool long fiber; and a whisker (e.g., SiC).

The fibrous body is preferably a product (so-called resin felt) obtained by processing an organic fiber and/or an inorganic fiber with a resin (e.g., a thermosetting resin) into felt. Specifically, the fibrous body is preferably formed of partially joined organic fibers. In this case, the fibrous body may be an organic fibrous body containing first organic fibers and second organic fibers having a lower melting point than the first organic fibers, the first organic fibers being partially joined by the second organic fibers.

The fibrous body may be formed of inorganic fibers joined by a binder. In this case, for example, a resin, such as a phenol resin, may be used as the binder. The fibrous body may be a nonwoven fabric. The fibrous body may be a needle-punched fibrous body.

The foam-molded body is not particularly limited as long as the foam-molded body has open cells. The foam-molded body is produced by, for example, foaming a resin so as to form open cells. The foam-molded body may be produced by foaming a resin and then performing crushing processing or the like to impart openness to cells formed by the foaming.

The resin for forming the foam-molded body is not particularly limited as long as the resin can be foam-molded, and may be, for example, a thermoplastic resin. Specifically, the resin for forming the foam-molded body may be, for example, one or more kinds selected from the group consisting of: polyurethane; polyolefins, such as polyethylene and polypropylene; polystyrene; a phenol resin; a melamine resin; a nitrile butadiene rubber; a chloroprene rubber; a styrene rubber; a silicone rubber; a urethane rubber; EPDM; and an ethylene-vinyl acetate copolymer.

In the soundproof member 1, the first elastic porous body layer 10 and the second elastic porous body layer 20 each have a thickness of 0.5 mm or more and 10 mm or less. That is, the thickness L1 of the first elastic porous body layer 10 is 0.5 mm or more and 10 mm or less, and the thickness L2 of the second elastic porous body layer 20 is 0.5 mm or more and 10 mm or less. Accordingly, the total (L1+L2) of the thickness L1 of the first elastic porous body layer 10 and the thickness L2 of the second elastic porous body layer 20 is 1 mm or more and 20 mm or less. The thickness of each of the elastic porous body layers 10 and 20 may be 1 mm or more and 9 mm or less, 2 mm or more and 8 mm or less, or 3 mm or more and 7 mm or less.

The thickness L1 of the first elastic porous body layer 10 and the thickness L2 of the second elastic porous body layer 20 may be set independently of each other. However, the ratio (L2/L1) of the thickness L2 of the second elastic porous body layer 20 to the thickness L1 of the first elastic porous body layer 10 (ratio calculated by dividing the thickness L2 of the second elastic porous body layer 20 by the thickness L1 of the first elastic porous body layer 10) may be, for example, 0.8 or more and 1.2 or less, or 0.9 or more and 1.1 or less.

The first elastic porous body layer 10 and the second elastic porous body layer 20 each have a bulk density of 25 kg/m$^3$ or more and 1,000 kg/m$^3$ or less. That is, the bulk density of the first elastic porous body layer 10 is 25 kg/m$^3$ or more and 1,000 kg/m$^3$ or less, and the bulk density of the second elastic porous body layer 20 is 25 kg/m$^3$ or more and 1,000 kg/m$^3$ or less. The bulk density of each of the elastic porous body layers 10 and 20 may be 25 kg/m$^3$ or more and 850 kg/m$^3$ or less, 35 kg/m$^3$ or more and 650 kg/m$^3$ or less, or 45 kg/m$^3$ or more and 550 kg/m$^3$ or less. The bulk density of each of the elastic porous body layers 10 and 20 is calculated on the basis of the thickness and mass per unit area thereof, which are measured by methods in conformity with JIS L 1913:2010.

The bulk density of the first elastic porous body layer 10 and the bulk density of the second elastic porous body layer 20 may be set independently of each other. However, the ratio of the bulk density of the second elastic porous body layer 20 to the bulk density of the first elastic porous body layer 10 may be, for example, 0.8 or more and 1.2 or less, or 0.9 or more and 1.1 or less.

The first elastic porous body layer 10 and the second elastic porous body layer 20 each have a Young's modulus of 7,000 Pa or more and 28,000 Pa or less. That is, the Young's modulus of the first elastic porous body layer 10 is 7,000 Pa or more and 28,000 Pa or less, and the Young's modulus of the second elastic porous body layer 20 is 7,000 Pa or more and 28,000 Pa or less. The Young's modulus of each of the elastic porous body layers 10 and 20 may be 9,000 Pa or more and 21,000 Pa or less, or 11,000 Pa or more and 17,000 Pa or less. The Young's modulus of each of the elastic porous body layers 10 and 20 is measured using, for example, a commercially available measurement apparatus (model QMA2011, manufactured by Mecanum Inc.).

The Young's modulus of the first elastic porous body layer 10 and the Young's modulus of the second elastic porous body layer 20 may be set independently of each other. That is, the Young's modulus of the first elastic porous body layer 10 and the Young's modulus of the second elastic porous body layer 20 may be equal to or different from each other.

The ratio of the Young's modulus of the second elastic porous body layer 20 to the Young's modulus of the first elastic porous body layer 10 may be, for example, 0.8 or more and 1.2 or less, or 0.9 or more and 1.1 or less.

The first elastic porous body layer 10 and the second elastic porous body layer 20 may each have, for example, a true density of 500 kg/m or more and 3,000 kg/m$^3$ or less, 800 kg/m$^3$ or more and 2,500 kg/m$^3$ or less, or 1,000 kg/m$^3$ or more and 2,000 kg/m$^3$ or less. The true density of each of the elastic porous body layers 10 and 20 is measured in accordance with JIS K 0061:2001.

The true density of the first elastic porous body layer 10 and the true density of the second elastic porous body layer 20 may be set independently of each other. However, the ratio of the true density of the second elastic porous body layer 20 to the true density of the first elastic porous body layer 10 may be, for example, 0.8 or more and 1.2 or less, or 0.9 or more and 1.1 or less.

When the first elastic porous body layer 10 and/or the second elastic porous body layer 20 is a fibrous body layer, the average fiber diameter of fibers forming the fibrous body layer is not particularly limited, but may fall within, for example, the range of from 1 µm or more to 1,000 µm or less.

The first elastic porous body layer 10 and the second elastic porous body layer 20 may each have, for example, a tortuosity of 1.0 (−) or more and 1.5 (−) or less, 1.0 (−) or more and 1.3 (−) or less, or 1.0 (−) or more and 1.1 (−) or less. The tortuosity of each of the elastic porous body layers 10 and 20 is measured using, for example, a commercially available measurement apparatus (tortuosity and characteristic length measurement system Torvith, manufactured by Nihon Onkyo Engineering Co., Ltd.).

The tortuosity of the first elastic porous body layer 10 and the tortuosity of the second elastic porous body layer 20 may be set independently of each other. However, the ratio of the tortuosity of the second elastic porous body layer 20 to the tortuosity of the first elastic porous body layer 10 may be, for example, 0.8 or more and 1.2 or less, or 0.9 or more and 1.1 or less.

The first elastic porous body layer 10 and the second elastic porous body layer 20 may each have, for example, a loss factor of 0 (−) or more and 1.0 (−) or less, 0.05 (−) or more and 0.5 (−) or less, or 0.1 (−) or more and 0.3 (−) or less.

The loss factor of the first elastic porous body layer 10 and the loss factor of the second elastic porous body layer 20 may be set independently of each other. However, the ratio of the loss factor of the second elastic porous body layer 20 to the loss factor of the first elastic porous body layer 10 may be, for example, 0.8 or more and 1.2 or less, or 0.9 or more and 1.1 or less.

The first elastic porous body layer 10 and the second elastic porous body layer 20 may each have, for example, a Poisson's ratio of 0 or more and 0.5 or less, 0 or more and 0.3 or less, or 0 or more and 0.1 or less. When the first elastic porous body layer 10 and the second elastic porous body layer 20 are each a fibrous body layer, the Poisson's ratio thereof is nearly 0 (zero).

The first elastic porous body layer 10 and the second elastic porous body layer 20 may each have, for example, a viscous characteristic length of 15 µm or more and 160 µm or less, 20 µm or more and 100 µm or less, or 25 µm or more and 70 µm or less.

The viscous characteristic length of each of the elastic porous body layers 10 and 20 is measured using, for example, a commercially available measurement apparatus (tortuosity and characteristic length measurement system Torvith, manufactured by Nihon Onkyo Engineering Co., Ltd.).

The viscous characteristic length of each of the elastic porous body layers 10 and 20 is expressed by the following equation (I) (reference: Allard, Propagation of Sound in Porous Media: Modelling Sound Absorbing Materials, Wiley (2009)).

$$\Lambda = \sqrt{\frac{8\eta\alpha_\infty}{\sigma\phi}} \frac{1}{Q} \qquad (I)$$

In the equation (I), Λ represents the viscous characteristic length (µm), σ represents a flow resistivity (Ns/m$^4$), φ represents a porosity (−), η represents the viscosity of air (Pa·s), α represents the tortuosity (−), and Q represents a shape parameter.

The porosity σ is calculated by the following equation (II). In the equation (II), ρ represents the bulk density (kg/m$^3$), and σ$_t$ represents the true density (kg/m$^3$).

$$\phi = 1 - \frac{\rho}{\rho_t} \qquad (II)$$

The viscous characteristic length of the first elastic porous body layer 10 and the viscous characteristic length of the second elastic porous body layer 20 may be set independently of each other. However, the ratio of the viscous characteristic length of the second elastic porous body layer 20 to the viscous characteristic length of the first elastic porous body layer 10 may be, for example, 0.8 or more and 1.2 or less, or 0.9 or more and 1.1 or less.

The first film layer 12 and the second film layer 22 are each formed of a film. The first film layer 12 and the second film layer 22 are each preferably formed of a resin film, particularly preferably formed of a thermoplastic resin. Further, the first film layer 12 and the second film layer 22 are each preferably formed of an elastomer film, particularly preferably formed of a thermoplastic elastomer (TPE).

The thermoplastic elastomer is, for example, one or more selected from the group consisting of: a polyurethane-based thermoplastic elastomer; a polystyrene-based thermoplastic elastomer; a polyester-based thermoplastic elastomer; a polyamide-based thermoplastic elastomer; a polyvinyl chloride thermoplastic elastomer; and a polyolefin-based thermoplastic elastomer.

The thicknesses of the first film layer 12 and the second film layer 22 are smaller than the thicknesses of the first elastic porous body layer 10 and the second elastic porous body layer 20. The thickness of each of the first film layer 12 and the second film layer 22 may be, for example, 1 μm or more and 200 μm or less, 10 μm or more and 100 μm or less, or 20 μm or more and 80 μm or less.

The first film layer 12 and the second film layer 22 are each preferably formed of a non-porous film. The bulk density and true density of each of the first film layer 12 and the second film layer 22 may each be, for example, 500 kg/m$^3$ or more and 2,000 kg/m$^3$ or less, 650 kg/m$^3$ or more and 1,500 kg/m$^3$ or less, or 800 kg/m$^3$ or more and 1,300 kg/m$^3$ or less.

The film layers 12 and 22 preferably have such flexibility as to be able to follow oscillatory deformations of the elastic porous body layers 10 and 20. The Young's modulus of each of the first film layer 12 and the second film layer 22 may be, for example, 1 MPa or more and 10,000 MPa or less, 10 MPa or more and 5,000 MPa or less, or 200 MPa or more and 900 MPa or less. The Young's modulus of each of the film layers 12 and 22 is measured by a method in conformity with JIS K7127:1999.

The first elastic porous body layer 10 and the first film layer 12 may be adjacently arranged via another layer, or may be arranged in contact with each other, but are preferably arranged in contact with each other as illustrated in FIG. 1.

Similarly, the second elastic porous body layer 20 and the second film layer 22 may be adjacently arranged via another layer, or may be arranged in contact with each other, but are preferably arranged in contact with each other as illustrated in FIG. 1.

The first film layer 12 and the second elastic porous body layer 20 may be adjacently arranged via another layer, or may be arranged in contact with each other, but are preferably arranged in contact with each other as illustrated in FIG. 1.

The above-mentioned four layers 10, 12, 20, and 22 are preferably a press molded body (preferably a hot press molded body) integrally molded by press molding (preferably hot press molding). In this case, the first elastic porous body layer 10 and the first film layer 12 are preferably arranged in contact with each other, the first film layer 12 and the second elastic porous body layer 20 are preferably arranged in contact with each other, and the second elastic porous body layer 20 and the second film layer 22 are preferably arranged in contact with each other.

The soundproof member 1 may further include another layer in addition to the above-mentioned four layers 10, 12, 20, and 22. That is, for example, the soundproof member 1 may further include another layer on the sound source S side of the first elastic porous body layer 10, and/or may further include another layer on the opposite side of the second film layer 22 to the sound source S.

The soundproof member 1 has a feature in that the specific parameter (L1/Λ1+L2/Λ2) falls within the specific range of 0.11 or more. The specific parameter (L1/Λ1+L2/Λ2) is calculated as the sum of the ratio (L1/Λ1) of the thickness L1 (mm) of the first elastic porous body layer 10 to the viscous characteristic length Λ1 (mm) thereof and the ratio (L2/Λ2) of the thickness L2 (mm) of the second elastic porous body layer 20 to the viscous characteristic length Λ2 (mm) thereof.

The specific parameter (L1/Λ1+L2/Λ2) of the soundproof member 1 is, for example, preferably 0.13 or more, more preferably 0.15 or more, particularly preferably 0.17 or more.

The upper limit value of the specific parameter (L1/Λ1+L2/Λ2) of the soundproof member 1 is not particularly limited, but the specific parameter may be, for example, 1.00 or less, 0.80 or less, 0.60 or less, or 0.50 or less. The range of the specific parameter (L1/Λ1+L2/Λ2) of the soundproof member 1 may be specified by arbitrarily combining any one of the above-mentioned lower limit values and any one of the above-mentioned upper limit values.

Figure 2A:
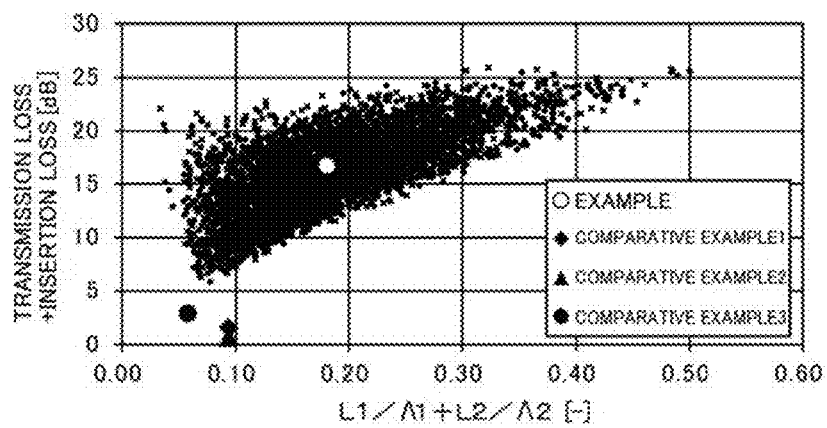
FIG. 2A is an explanatory graph showing a correlation, obtained through numerical simulation, between the total (L1/Λ1+L2/Λ2) of the ratio (L1/Λ1) of the thickness L1 of a first sound-absorbing layer to the viscous characteristic length Λ1 thereof and the ratio (L2/Λ2) of the thickness L2 of a second sound-absorbing layer to the viscous characteristic length Λ2 thereof, and the total of transmission loss and insertion loss.

FIG. 2A shows a relationship, determined through numerical simulation, between the specific parameter (L1/Λ1+L2/Λ2) of a soundproof member (horizontal axis), and the total value (dB) of the perpendicular transmission loss and insertion loss of the soundproof member (vertical axis).

The numerical simulation was performed using a computer having installed thereon commercially available acoustic analysis software (ACTRAN (trademark), manufactured by Free Field Technologies).

Specifically, a model in which vibration and sound were propagated one-dimensionally in the perpendicular direction of a flat plate-shaped soundproof member sample that was, like the soundproof member 1 illustrated in FIG. 1, formed of a first sound-absorbing layer that was an elastic porous body (corresponding to the first elastic porous body layer 10), a first sound-insulating layer that was a film (corresponding to the first film layer 12), a second sound-absorbing layer that was an elastic porous body (corresponding to the second elastic porous body layer 20), and a second sound-insulating layer that was a film (corresponding to the second film layer 22), which were laminated in the stated order from the sound source side, was created, and the perpendicular transmission loss and insertion loss of the soundproof member sample were calculated. Physical property values included in the software ACTRAN (trademark) were used as the physical property values of air.

In the numerical simulation, for each of the first sound-absorbing layer and the second sound-absorbing layer of the soundproof member sample, the true density $\rho_t$ was fixed at 1,380 kg/m$^3$, the fiber diameter was fixed at 20.8 μm, the tortuosity $\alpha_\infty$ was fixed at 1, the loss factor was fixed at 0.3, and the Poisson's ratio was fixed at 0, and under these conditions, the thickness was varied from 0.5 mm to 10 mm, the bulk density was varied from 25 kg/m$^3$ to 1,380 kg/m$^3$, and the Young's modulus was varied from 7,000 Pa to 28,000 Pa, and the perpendicular transmission loss and insertion loss of the soundproof member sample were calculated.

Each point plotted in FIG. 2A is a result calculated by the numerical simulation. The total value (dB) of the perpendicular transmission loss and the insertion loss shown on the vertical axis of FIG. 2A is an average value calculated by subjecting results, calculated in the frequency range of from 100 Hz or more to 2,500 Hz or less by the numerical simulation, to weighted correction in consideration of the frequency characteristics of the human ear (e.g., difficulty in hearing low-frequency sound).

As shown in FIG. 2A, the inventors of the present invention have made extensive investigations regarding what configuration a soundproof member having excellent soundproof characteristics has, in particular, regarding a configuration required for improving not only the transmission loss, but also the insertion loss, and as a result, have found that, surprisingly, the specific parameter (L1/Λ1+L2/Λ2), i.e., the total of the ratio (L1/Λ1) of the thickness L1 (mm) of the first elastic porous body layer 10 to the viscous characteristic length Λ1 (μm) thereof and the ratio (L2/Λ2) of the thickness L2 (mm) of the second elastic porous body layer 20 to the viscous characteristic length Λ2 (μm) thereof shows a high correlation with the total of the transmission loss and the insertion loss.

The soundproof member 1 according to the present invention has a configuration and soundproof characteristics (specifically, such soundproof characteristics that the total of the acoustic loss and the insertion loss is 8 dB or more) corresponding to, among the points plotted in FIG. 2A, points plotted within the range in which the specific parameter (L1/Λ1+L2/Λ2) on the horizontal axis is 0.11 or more (more specifically, 0.11 or more and 0.50 or less).

In FIG. 2A, the point plotted as a white circle represents the specific parameter (L1/Λ1+L2/Λ2) and soundproof characteristics of Example actually realized as an example of the soundproof member 1 according to the present invention.

That is, the soundproof member 1 according to this Example was a flat plate-shaped hot press molded body formed of the first elastic porous body layer 10, the first film layer 12, the second elastic porous body layer 20, and the second film layer 22 that were laminated in the stated order from the sound source side, and had a specific parameter (L1/Λ1+L2/Λ2) of 0.18 (−) and a total of acoustic loss and insertion loss of 16.7 dB.

Specifically, each of the first elastic porous body layer 10 and the second elastic porous body layer 20 included in the soundproof member 1 according to Example was a nonwoven fabric (organic fibrous body layer) obtained by needle-punching PET fibers partially joined by another resin fiber and having an average fiber diameter of 20.8 μm, and had a thickness of 5 mm, a bulk density of 100 kg/m³, a true density of 1,380 kg/m³, a Young's modulus of 14,000 Pa, a viscous characteristic length of 53 μm, a tortuosity of 1 (−), a loss factor of 0.182 (−), and a Poisson's ratio of nearly 0 (zero).

In addition, each of the first film layer 12 and the second film layer 22 included in the soundproof member 1 according to Example was a non-porous film of a polyurethane-based thermoplastic elastomer, and had a thickness of 0.3 μm, a bulk density and true density of 1,167 kg/m³, and a Young's modulus of 461 MPa.

Meanwhile, in FIG. 2A, the black filled rhombus is plotted, as Comparative Example 1, for a soundproof member that is a flat plate-shaped hot press molded body formed of a first sound-absorbing layer that is polyurethane foam, a first sound-insulating layer that is a non-porous film of a polyurethane-based thermoplastic elastomer, a second sound-absorbing layer that is polyurethane foam, and a second sound-insulating layer that is a non-porous film of a polyurethane-based thermoplastic elastomer, which are laminated in the stated order from the sound source side. The soundproof member according to Comparative Example 1 had a specific parameter (L1/Λ1+L2/Λ2) of 0.09 (−), and a total of acoustic loss and insertion loss of 2 dB.

In addition, in FIG. 2A, the black filled triangle is plotted, as Comparative Example 2, for a soundproof member formed of one sound-absorbing layer that is polyurethane foam. The soundproof member according to Comparative Example 2 had a specific parameter (L1/Λ1+L2/Λ2) of 0.09 (−), and a total of acoustic loss and insertion loss of 1 dB.

In addition, in FIG. 2A, the black filled circle is plotted, as Comparative Example 3, for a soundproof member formed of single sound-absorbing layer that is an organic fibrous body (PET fibrous body) identical to each of the nonwoven fabrics included as the elastic porous body layers 10 and 20 in the soundproof member 1 according to Example described above. The soundproof member according to Comparative Example 3 had a specific parameter (L1/Λ1+L2/Λ2) of 0.06 (−), and a total of acoustic loss and insertion loss of 3 dB.

Figure 2B:
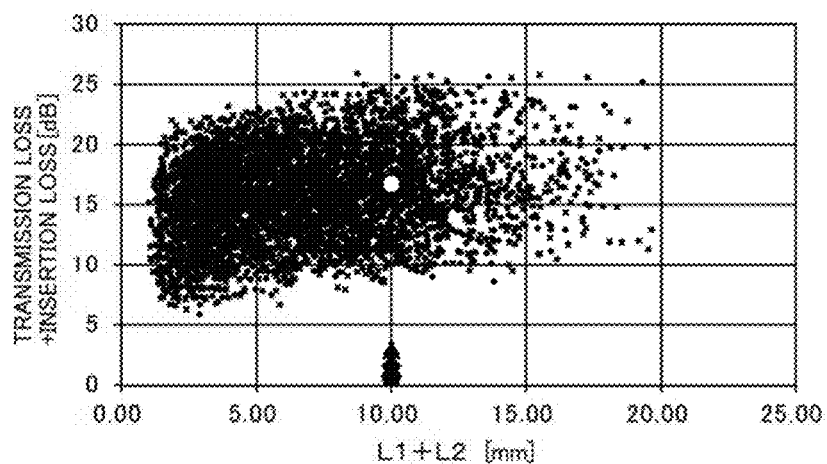
FIG. 2B is an explanatory graph showing a correlation, obtained through numerical simulation, between the total (L1+L2) of the thickness L1 of the first sound-absorbing layer and the thickness L2 of the second sound-absorbing layer, and the total of transmission loss and insertion loss.

FIG. 2B is a plot of the results of the above-mentioned numerical simulation with the horizontal axis representing the total (L1+L2) of the thickness of the first sound-absorbing layer (corresponding to the thickness L1 of the first elastic porous body layer 10) and the thickness of the second sound-absorbing layer (corresponding to the thickness L2 of the second elastic porous body layer 20).

Figure 2C:
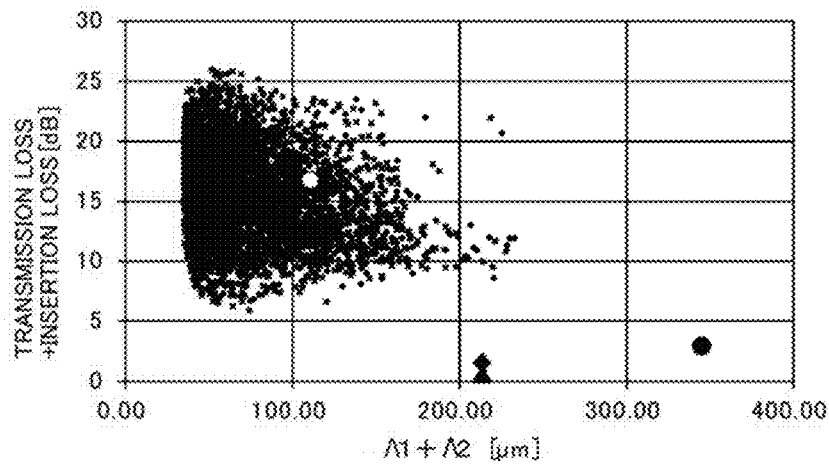
FIG. 2C is an explanatory graph showing a correlation, obtained through numerical simulation, between the total (Λ1+Λ2) of the viscous characteristic length Λ1 of the first sound-absorbing layer and the viscous characteristic length Λ2 of the second sound-absorbing layer, and the total of transmission loss and insertion loss.

FIG. 2C is a plot of the results of the above-mentioned numerical simulation with the horizontal axis representing the total (Λ1+Λ2) of the viscous characteristic length of the first sound-absorbing layer (corresponding to the viscous characteristic length Λ1 of the first elastic porous body layer 10) and the viscous characteristic length of the second sound-absorbing layer (corresponding to the viscous characteristic length Λ2 of the second elastic porous body layer 20).

As shown in FIG. 2B and FIG. 2C, in the case of using only the total (L1+L2) of the thicknesses of the sound-absorbing layers or only the total (Λ1+Λ2) of the viscous characteristic lengths thereof as an indicator, unlike the case of using the specific parameter (L1/Λ1+L2/Λ2) as an indicator as shown in FIG. 2A, a high correlation with the total of transmission loss and insertion loss was not found, and it was impossible to clearly distinguish the soundproof member according to Example from the soundproof members according to Comparative Examples 1 to 3.

The invention claimed is:

1. A soundproof member, comprising:
   a first elastic porous body layer;
   a first film layer;
   a second elastic porous body layer; and
   a second film layer,
   the layers being arranged in the stated order from a sound source side,
   wherein the first elastic porous body layer and the second elastic porous body layer each have:
      a thickness of 0.5 mm or more and 10 mm or less;
      a bulk density of 25 kg/m³ or more and 2,000 kg/m³ or less;
      a Young's modulus of 7,000 Pa or more and 28,000 Pa or less; and
      a viscous characteristic length of 15 μm or more and 160 μm or less, and
   wherein a total (L1/Λ1+L2/Λ2) of a ratio (L1/Λ1) of the thickness L1 in mm, of the first elastic porous body layer to the viscous characteristic length Λ1, in μm, thereof and a ratio (L2/Λ2) of the thickness L2, in mm, of the second elastic porous body layer to the viscous characteristic length Λ2, in μm, thereof is 0.11 or more.

2. The soundproof member according to claim 1, wherein the first elastic porous body layer and the second elastic porous body layer are each a fibrous body layer.

3. The soundproof member according to claim 1, wherein the first film layer and the second film layer are each an elastomer film layer.

4. The soundproof member according to claim 2, wherein the first film layer and the second film layer are each an elastomer film layer.

\* \* \* \* \*